(12) United States Patent
Wang et al.

(10) Patent No.: US 11,202,133 B2
(45) Date of Patent: Dec. 14, 2021

(54) AUDIO COMPONENT AND MOBILE TERMINAL

(71) Applicant: HONOR DEVICE CO., LTD., Guangdong (CN)

(72) Inventors: Bin Wang, Shanghai (CN); Mingjun Chen, Shanghai (CN); Xin Zhu, Shanghai (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 16/651,597

(22) PCT Filed: Jan. 26, 2018

(86) PCT No.: PCT/CN2018/074273
§ 371 (c)(1),
(2) Date: Mar. 27, 2020

(87) PCT Pub. No.: WO2019/061972
PCT Pub. Date: Apr. 4, 2019

(65) Prior Publication Data
US 2020/0260166 A1    Aug. 13, 2020

(30) Foreign Application Priority Data
Sep. 29, 2017    (CN) .......................... 201710911577.1

(51) Int. Cl.
*H04R 1/02* (2006.01)
*G06F 1/16* (2006.01)

(52) U.S. Cl.
CPC ........... *H04R 1/021* (2013.01); *G06F 1/1656* (2013.01); *H04R 1/025* (2013.01); *H04R 2420/09* (2013.01); *H04R 2499/11* (2013.01)

(58) Field of Classification Search
CPC .... H04R 1/021; H04R 1/025; H04R 2499/11; H04R 2420/09; H04R 1/345
(Continued)

(56) References Cited

U.S. PATENT DOCUMENTS

2010/0034415 A1    2/2010  Tsao et al.
2012/0275637 A1*  11/2012  Liao ........................ H04R 1/025
                                                              381/395
(Continued)

FOREIGN PATENT DOCUMENTS

CN    101645942 A    2/2010
CN    102333263 A    1/2012
(Continued)

*Primary Examiner* — Alexander Krzystan
*Assistant Examiner* — Julie X Dang
(74) *Attorney, Agent, or Firm* — Womble Bond Dickinson (US) LLP

(57) ABSTRACT

The present disclosure relates to an audio component, including an enclosure, a speaker, and a connector. The enclosure includes a receptacle and a connection hole connected to the receptacle, both the speaker and the connector are accommodated in the receptacle, a plug port of the connector is connected to outside of the enclosure by using the connection hole, a sound guide channel connected between the speaker and the plug port is formed in the receptacle, and the sound guide channel is configured to propagate, to the plug port, a sound emitted by the speaker. This disclosure further discloses a mobile terminal.

19 Claims, 7 Drawing Sheets

(58) Field of Classification Search
USPC .................................. 381/381, 386, 380, 395
See application file for complete search history.

(56) References Cited

U.S. PATENT DOCUMENTS

| | | |
|---|---|---|
| 2013/0051595 A1 | 2/2013 | Yang et al. |
| 2013/0070947 A1* | 3/2013 | Chien .................. H04R 1/2803 |
| | | 381/332 |
| 2014/0004913 A1 | 1/2014 | Kimura et al. |
| 2014/0294225 A1* | 10/2014 | Ji .......................... H04R 1/023 |
| | | 381/386 |
| 2015/0086064 A1 | 3/2015 | Froemel |
| 2016/0037259 A1 | 2/2016 | Akino |

FOREIGN PATENT DOCUMENTS

| | | |
|---|---|---|
| CN | 102347998 A | 2/2012 |
| CN | 104320734 A | 1/2015 |
| CN | 205726398 U | 11/2016 |
| CN | 206164794 U | 5/2017 |
| CN | 106990812 A | 7/2017 |
| CN | 206807511 U | 12/2017 |
| CN | 206807767 U | 12/2017 |
| JP | 2017135618 A | 8/2017 |

* cited by examiner

AUDIO COMPONENT AND MOBILE TERMINAL

CROSS-REFERENCE TO RELATED APPLICATIONS

This application is a national stage of International Application No. PCT/CN2018/074273, filed on Jan. 26, 2018, which claims priority to Chinese Patent Application No. 201710911577.1, filed on Sep. 29, 2017. Both of the aforementioned applications are hereby incorporated by reference in their entireties.

TECHNICAL FIELD

This application relates to the field of electronic devices, and in particular, to an audio component and a mobile terminal.

BACKGROUND

Currently, a mobile phone on the market is usually provided with a plurality of holes at the bottom, including a universal serial bus (USB) hole, a speaker hole, a headset hole, a microphone hole, and the like. Because the mobile phone is provided with a relatively large quantity of holes at the bottom, external vapor, dust, and the like easily enter inside of the mobile phone through these holes. Consequently, a component inside the mobile phone is faulty or damaged, and a service life of the mobile phone is reduced.

SUMMARY

This application provides an audio component and a mobile terminal that have a relatively long service life.

According to a first aspect, this application provides an audio component. The audio component may be applied to a mobile terminal. The audio component includes an enclosure, a speaker, and a connector. The enclosure includes a receptacle and a connection hole connected to the receptacle. The receptacle is connected to outside of the enclosure by using the connection hole. Both the speaker and the connector are accommodated in the receptacle. A plug port of the connector is connected to the outside of the enclosure by using the connection hole. A sound guide channel connected between the speaker and the plug port is formed in the receptacle, and the sound guide channel is configured to propagate, to the plug port, a sound emitted by the speaker.

In this embodiment, the audio component implements a connection relationship between the connector and the outside by using the connection hole, and also implements sound output of the speaker by using the connection hole. The connector shares the connection hole with the speaker, so that a quantity of holes that need to be disposed on the enclosure of the audio component is reduced, in other words, holes that need to be disposed on a housing of the mobile terminal to which the audio component is applied are reduced, to reduce a risk that external vapor, dust, and the like enter the audio component and inside of the mobile terminal, so that the audio component and the mobile terminal are not easily faulty or damaged. Therefore, the audio component and the mobile terminal have higher reliability and relatively long service lives. In addition, a hole corresponding to the connection hole is disposed on the housing of the mobile terminal, so that a connection requirement of the connector and a sound output requirement of the speaker can be compatible. Therefore, an extra hole can be avoided in appearance of the housing, so that appearance of the mobile terminal is simple.

It may be understood that both the speaker and the connector are accommodated in the receptacle, in other words, both the speaker and the connector are fastened to inside of the enclosure. Therefore, the audio component can be assembled into an integrated module, so that the audio component is quickly assembled in the mobile terminal, thereby reducing an assembly step and difficulty that are of the mobile terminal.

In one embodiment, the connector includes a shielding enclosure. The plug port is formed in the shielding enclosure. A through hole is disposed on the shielding enclosure, and the through hole is configured to connect the sound guide channel and the plug port. The connector further includes an insulator. The insulator includes a tongue and a sealing end, and one end of the tongue is fixedly connected to the sealing end. The sealing end is fixedly connected to a first end of the shielding enclosure, to seal the first end of the shielding enclosure. The sealing end can prevent external vapor, dust, and the like from entering the audio component from the first end of the shielding enclosure, to improve reliability of the audio component. The tongue is accommodated in the plug port. A connection pin (not shown in the figure) is disposed on the tongue, and the connection pin is configured to electrically connect to an external component, to implement an electrical connection between the external component and each of the connector and an internal component of the mobile terminal. An opening is disposed at a second end that is of the shielding enclosure and that is opposite to the first end, so that the plug port can be connected to outside of the shielding enclosure.

The shielding enclosure includes two flat plate parts that are opposite to each other and an arc-shaped connection part that is correspondingly connected between the two flat plate parts. The through hole is disposed on one of the flat plate parts. In one embodiment, the through hole may alternatively be disposed on the two flat plate parts, to increase a connection area between the plug port and the sound guide channel, thereby improving sound output quality of the audio component.

In one embodiment, one end of the shielding enclosure sticks out the enclosure from the connection hole, and an outer sidewall of the shielding enclosure cooperates with a hole wall of the connection hole. In other words, one end of the shielding enclosure is inserted into the connection hole, a part of one end of the shielding enclosure is located in the outside of the enclosure, and the other end of the shielding enclosure is accommodated in the receptacle. In this case, the hole wall of the connection hole limits the shielding enclosure. Because the part of the end of the shielding enclosure is located in the outside of the enclosure, it is convenient for the external component to insert into the plug port, thereby improving experience of using the audio component and the mobile terminal by a user. In addition, a part of the shielding enclosure that sticks out the enclosure can cooperate with an opening on the housing of the mobile terminal, so that the audio component is fastened to the housing, and the plug port can be connected to outside of the housing by using the opening.

In one embodiment, the enclosure includes a first enclosure part and a second enclosure part that are combined together, and the receptacle is formed between the first enclosure part and the second enclosure part. A side of the first enclosure part that faces the second enclosure part is concave to form a first groove, and a side of the second enclosure part that faces the first enclosure part is concave to form a second groove. When the first enclosure part and the second enclosure part are combined together, the first groove and the second groove are combined to jointly form the receptacle.

The first enclosure part and the second enclosure part may be connected through bonding, screwing, buckling, or the like. A sealing element is sandwiched between the first enclosure part and the second enclosure part, and the sealing element is configured to seal the receptacle. The sealing element is in a ring shape, and a shape of the sealing element adapts to a shape of an end face on which the first enclosure part is connected to the second enclosure part.

The enclosure seals the speaker in the receptacle, so that front and back cavities of the speaker can be prevented from being short-circuited, to fully exert performance of the speaker, change a low frequency and a high frequency that are of a sound, and reproduce an authentic sound.

Both the first enclosure part and the second enclosure part use a plastic material, to reduce a weight of the audio component.

In one embodiment, an abutting protrusion is disposed on an inner side surface of the second enclosure part that faces the receptacle. The speaker is located between an inner side surface of the first enclosure part that faces the receptacle and the abutting protrusion, to form a first part that is of the sound guide channel and that is between the speaker and the inner side surface of the second enclosure part. Because the abutting protrusion abuts against the speaker, space is formed between the speaker and the inner side surface of the second enclosure part, so that the first part of the sound guide channel can be constituted. A sound emitted by the speaker enters the first part of the sound guide channel.

A middle part of the abutting protrusion is hollowed out. In this case, the abutting protrusion is in an annular shape, to reduce a weight of the enclosure, thereby helping reduce weights of the audio component and the mobile terminal.

In one embodiment, a limiting protrusion is disposed on the inner side surface of the first enclosure part, placement space is enclosed by the limiting protrusion, and an end of the speaker away from the abutting protrusion is located in the placement space. The limiting protrusion can limit the speaker, so that the speaker is fastened in the receptacle, thereby avoiding a risk of damage caused by shaking.

In one embodiment, the audio component further includes a circuit board. The connector is mounted on the circuit board. The circuit board may be a main board of the mobile terminal. The connector is electrically connected to a component of the mobile terminal by using the circuit board. The circuit board is accommodated in the receptacle and is fastened to the second enclosure part. The circuit board and the speaker are alternately disposed, to form a second part that is of the sound guide channel and that is between the circuit board and the speaker. The second part of the sound guide channel is connected to the first part of the sound guide channel. The circuit board and the speaker are alternately disposed, so that assembly of the audio component is also facilitated, to avoid damaging a component in an assembly process.

A plurality of connection posts are convexly disposed on the inner side surface of the second enclosure part. A plurality of connection holes are disposed on the circuit board. The audio component further includes a plurality of fasteners. The plurality of fasteners pass through the plurality of connection holes in a one-to-one correspondence and are fastened to the plurality of connection posts. At least two of the connection holes are arranged on two opposite sides of the connector, to improve mounting stability of the connector.

In one embodiment, the inner side surface of the first enclosure part and the circuit board are alternately disposed, and the inner side surface of the first enclosure part and the connector are alternately disposed, to form a third part that is of the sound guide channel and that is between the inner side surface of the first enclosure part and a side including the circuit board and the connector. The third part of the sound guide channel is connected between the second part of the sound guide channel and the through hole. The sound emitted by the speaker successively passes through the first part of the sound guide channel, the second part of the sound guide channel, the third part of the sound guide channel, and the through hole, and enters the plug port, to implement sound output.

In one embodiment, a concave guide trough is disposed on the inner side surface of the first enclosure part. The guide trough is connected to the third part of the sound guide channel. The guide trough is disposed to reduce thickness of a part of an area of the first enclosure part, and increase a space capacity of the sound guide channel, so that propagation quality of the sound emitted by the speaker is better.

In one embodiment, the guide trough is connected between the second part of the sound guide channel and the through hole. An orthographic projection of the hole wall of the through hole on the inner side surface of the first enclosure part falls into the guide trough. In other words, the guide trough covers the through hole, and the guide trough cooperates with the third part of the sound guide channel, so that the sound wave can be better guided to the through hole, to smoothly enter the plug port.

A notch is disposed on one side of the limiting protrusion that faces the second part of the sound guide channel, and the notch is configured to increase propagation space of the sound wave, so that propagation quality of the sound emitted by the speaker is better. The notch connects the guide trough and the third part of the sound guide channel.

According to a second aspect, this application provides a mobile terminal, including a housing and the foregoing audio component. The housing includes an opening, and the opening connects inside and outside that are of the housing. The audio component is mounted in the inside of the housing, the connection hole of the enclosure exactly faces the opening, and the plug port is connected to outside of the mobile terminal by using the opening. The mobile terminal in this embodiment of this application may be any device that has a communication function and a storage function, for example, an intelligent device that has a network function, such as a tablet computer, a mobile phone, an e-reader, a remote control, a personal computer (PC), a notebook computer, a vehicle-mounted device, a web television, or a wearable device.

In this embodiment, the connection hole exactly faces the opening, and the plug port is connected to the outside of the mobile terminal by using the opening. Therefore, the mobile terminal can implement a connection relationship between the connector and the outside by using the opening, and can also implement sound output of the speaker by using the opening. The connector shares the opening with the speaker, so that a quantity of holes that need to be disposed on the housing is reduced, to reduce a risk that external vapor, dust, and the like enter inside of the mobile terminal, so that the mobile terminal is not easily faulty or damaged. Therefore, the mobile terminal has higher reliability and a relatively long service life. In addition, the opening corresponding to the connection hole is disposed on the housing of the mobile terminal, so that a connection requirement of the connector and a sound output requirement of the speaker can be compatible. Therefore, an extra hole can be avoided in appearance of the housing, so that appearance of the mobile terminal is simple. In addition, the holes on the housing are reduced, so that processing and manufacturing costs of the housing can be reduced, and a structural material (for example, a dust filter or a decoration part) in an existing speaker hole is omitted. Therefore, overall costs of the mobile terminal are reduced.

A part of the shielding enclosure is located in the opening, and a wall surface of the opening cooperates with an outer sidewall of the shielding enclosure, to limit the shielding enclosure, so that an external component is inserted into the plug port of the shielding enclosure, thereby improving experience of using the mobile terminal by a user.

In one embodiment, the mobile terminal further includes a plug component. The plug component includes a shielding sleeve. A sound guide hole is disposed on the shielding sleeve. When the plug component is electrically connected to the connector, a part of the shielding sleeve is inserted into the plug port, and the sound guide hole is connected to the plug port and at least a part of the sound guide hole is located in the outside of the housing, to propagate, to the outside of the mobile terminal, a sound emitted by the speaker.

In this embodiment, the sound emitted by the speaker successively passes through the sound guide channel, the connection hole, the plug port, and the sound guide hole, and then is propagated to the outside of the mobile terminal, to implement sound output. When the plug component is plugged in the connector, the mobile terminal can be charged or data transmission can be implemented. Therefore, when the plug component is inserted into the plug port, functions such as charging and data transmission can be implemented for the mobile terminal, and sound output can also be implemented by using the sound guide hole.

It may be understood that the plug component includes at least one component adapted to the connector. For example, the connector is a female connector of a universal serial bus (USB) connector, and the plug component includes a male connector of the universal serial bus connector. Certainly, in another embodiment, the connector may alternatively be a male connector of a universal serial bus connector, and the plug component includes a female connector of the universal serial bus connector. When the connector is the universal serial bus connector, the plug port is approximately in a shape of a runway-shaped long circular hole, so that the speaker has a relatively large sound output area, thereby ensuring sound output quality. In another embodiment, the connector may alternatively be another type of electrical connector.

The plug component may further include a connection cable, and the connection cable is connected to a connector at one end of the plug component.

DESCRIPTION OF EMBODIMENTS

Figure 1:
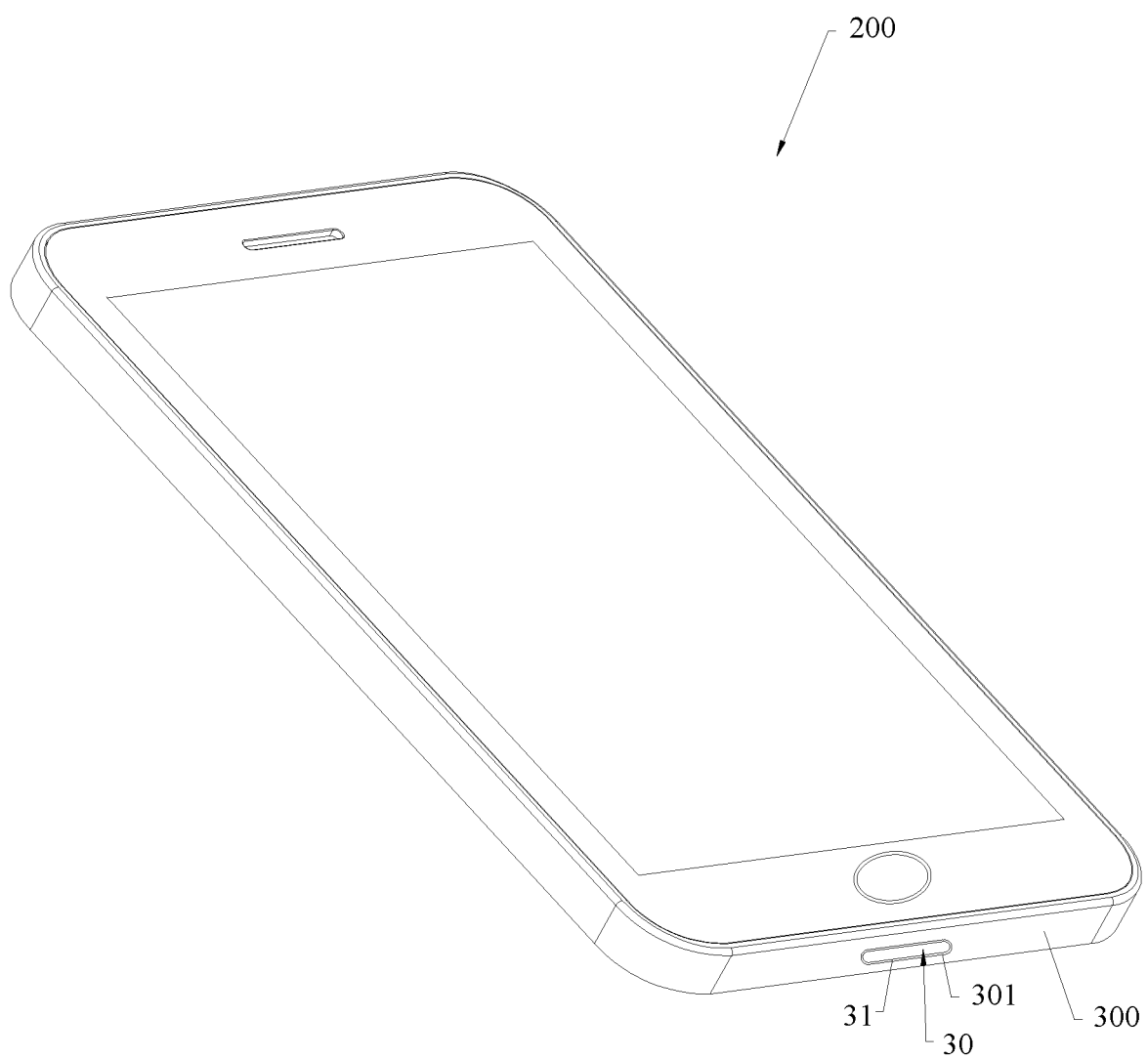
FIG. 1 is a schematic structural diagram of a mobile terminal according to an embodiment of this application.

The following describes embodiments of this application with reference to the accompanying drawings in the embodiments of this application.

Referring to FIG. 1 to FIG. 5 together, this application provides an audio component 100. The audio component 100 may be applied to a mobile terminal 200. The audio component 100 includes an enclosure 1, a speaker 2, and a connector 3. The enclosure 1 includes a receptacle 10 and a connection hole 11 connected to the receptacle 10. The receptacle 10 is connected to outside of the enclosure 1 by using the connection hole 11. Both the speaker 2 and the connector 3 are accommodated in the receptacle 10. A plug port 30 of the connector 3 is connected to the outside of the enclosure 1 by using the connection hole 11. A sound guide channel 4 connected between the speaker 2 and the plug port 30 is formed in the receptacle 10, and the sound guide channel 4 is configured to propagate, to the plug port 30, a sound emitted by the speaker 2.

In one embodiment, the audio component 100 implements a connection relationship between the connector 3 and the outside by using the connection hole 11, and also implements sound output of the speaker 2 by using the connection hole 11. The connector 3 shares the connection hole 11 with the speaker 2, so that a quantity of holes that need to be disposed on the enclosure 1 of the audio component 100 is reduced, in other words, holes that need to be disposed on a housing 300 of the mobile terminal 200 to which the audio component 100 is applied are reduced, to reduce a risk that external vapor, dust, and the like enter the audio component 100 and inside of the mobile terminal 200, so that the audio component 100 and the mobile terminal 200 are not easily faulty or damaged. Therefore, the audio component 100 and the mobile terminal 200 have higher reliability and relatively long service lives. In addition, a hole corresponding to the connection hole 11 is disposed on the housing 300 of the mobile terminal 200, so that a connection requirement of the connector 3 and a sound output requirement of the speaker 2 can be compatible. Therefore, an extra hole can be avoided in appearance of the housing 300, so that appearance of the mobile terminal 200 is simple.

It may be understood that both the speaker 2 and the connector 3 are accommodated in the receptacle 10, in other words, both the speaker 2 and the connector 3 are fastened to inside of the enclosure 1. Therefore, the audio component 100 can be assembled into an integrated module, so that the audio component 100 is quickly assembled in the mobile terminal 200, thereby reducing an assembly step and difficulty that are of the mobile terminal 200.

When the connector 3 is a universal serial bus (USB) connector, the plug port 30 is approximately in a shape of a runway-shaped long circular hole, so that the speaker 2 has a relatively large sound output area, thereby ensuring sound output quality. In another embodiment, the connector 3 may alternatively be another type of electrical connector.

Figure 3:
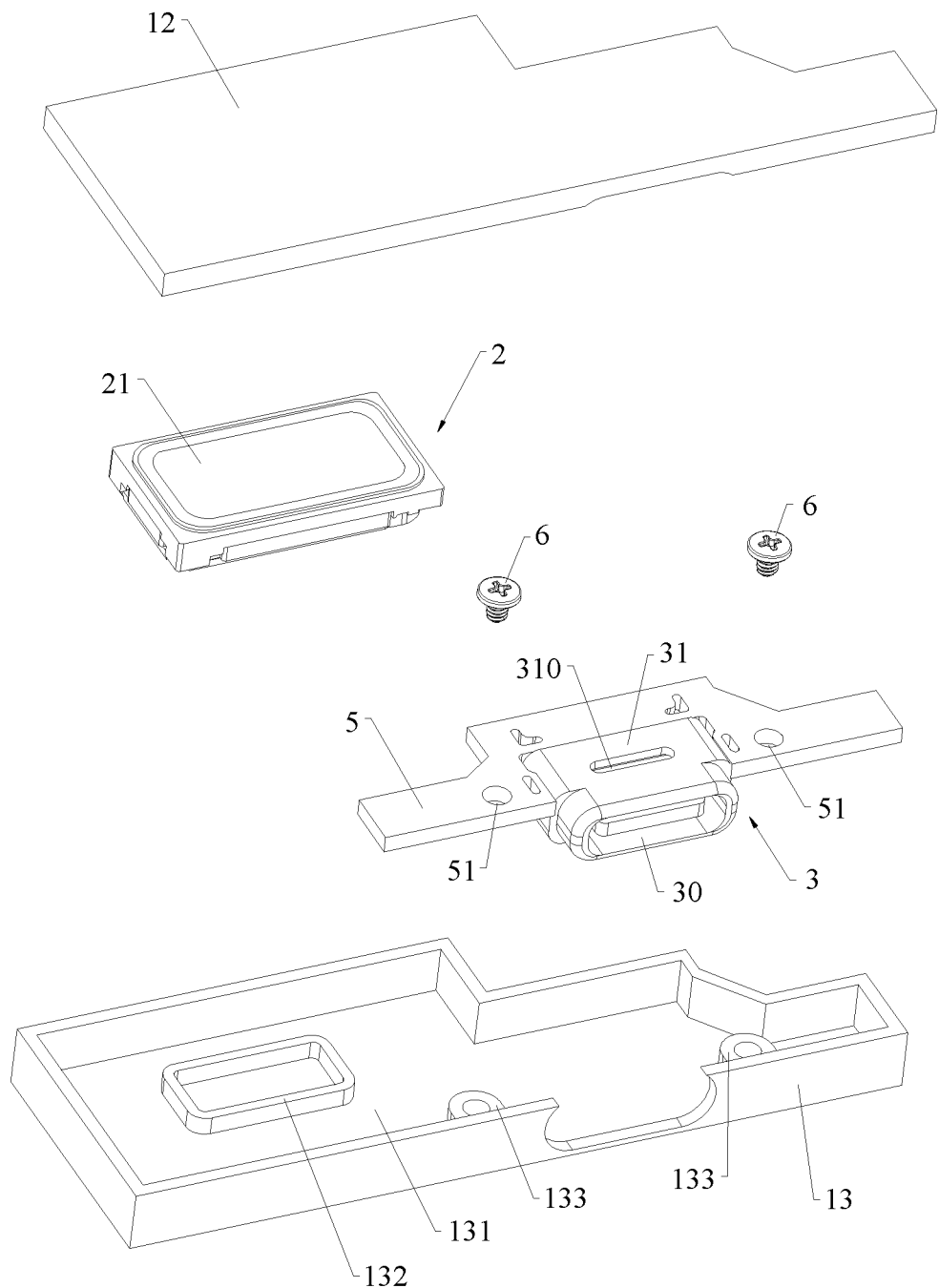
FIG. 3 is an exploded view of the audio component shown in FIG. 2.
Figure 5:
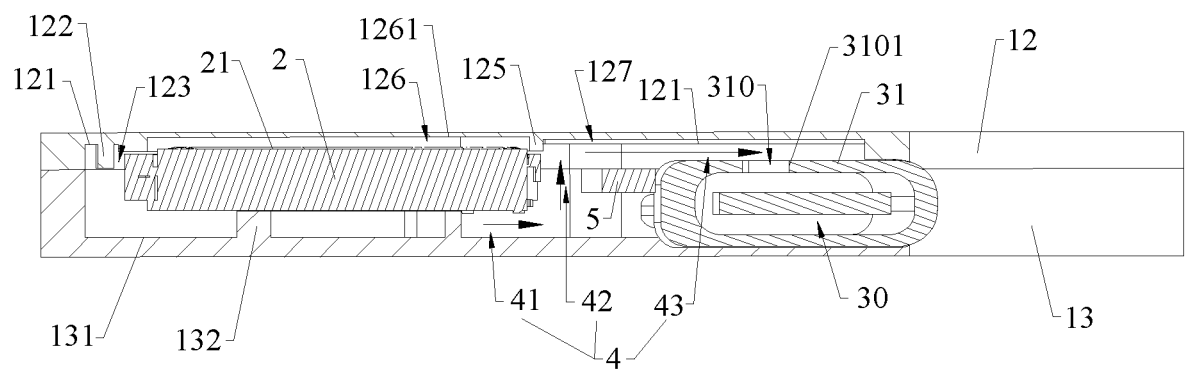
FIG. 5 is a schematic structural diagram obtained when the audio component shown in FIG. 2 is cut along a line A-A.
Figure 6:
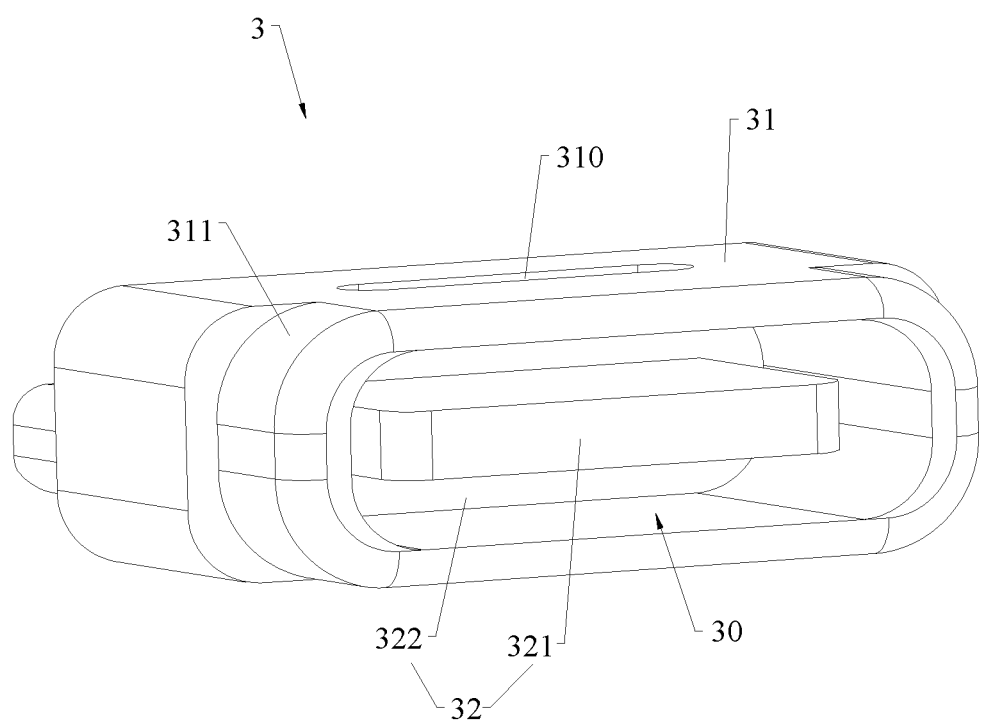
FIG. 6 is a schematic structural diagram of a connector in FIG. 3.

In one embodiment, referring to FIG. 3, FIG. 5, and FIG. 6 together, the connector 3 includes a shielding enclosure 31. The plug port 30 is formed in the shielding enclosure 31. A through hole 310 is disposed on the shielding enclosure 31, and the through hole 310 is configured to connect the sound guide channel 4 and the plug port 30. The connector 3 further includes an insulator 32. The insulator 32 includes a tongue 321 and a sealing end 322, and one end of the tongue 321 is fixedly connected to the sealing end 322. The sealing end 322 is fixedly connected to a first end of the shielding enclosure 31, to seal the first end of the shielding enclosure 31. The sealing end 322 can prevent external vapor, dust, and the like from entering the audio component 100 from the first end of the shielding enclosure 31, to improve reliability of the audio component 100. The tongue 321 is accommodated in the plug port 30. A connection pin (not shown in the figure) is disposed on the tongue 321, and the connection pin is configured to electrically connect to an external component, to implement an electrical connection between the external component and each of the connector 3 and an internal component of the mobile terminal 200. An opening is disposed at a second end that is of shielding enclosure 31 and that is opposite to the first end, so that the plug port 30 can be connected to outside of the shielding enclosure 31.

The shielding enclosure 31 includes two flat plate parts that are opposite to each other and an arc-shaped connection part that is correspondingly connected between the two flat plate parts. The through hole 310 is disposed on one of the flat plate parts. In another embodiment, the through hole 310 may alternatively be disposed on the two flat plate parts, to increase a connection area between the plug port 30 and the sound guide channel 4, thereby improving sound output quality of the audio component 100.

It may be understood that that the connector 3 is accommodated in the receptacle 10 means that a large part of a structure of the connector 3 is accommodated in the receptacle 10, and a small part (for example, one end of the shielding enclosure 31 configured to form the plug port 30) of the structure of the connector 3 may pass through the connection hole 11 and partially stick out the enclosure 1. Certainly, in another embodiment, the connector 3 may alternatively be fully accommodated in the receptacle 10, and an inner sidewall of the shielding enclosure 31 that faces the plug port 30 is aligned with a hole wall 111 of the connection hole 11, so that the plug port 30 is connected to the connection hole 11. After successively sticking into the connection hole 11 and the plug port 30, the external component is electrically connected to the connector 3.

Figure 2:
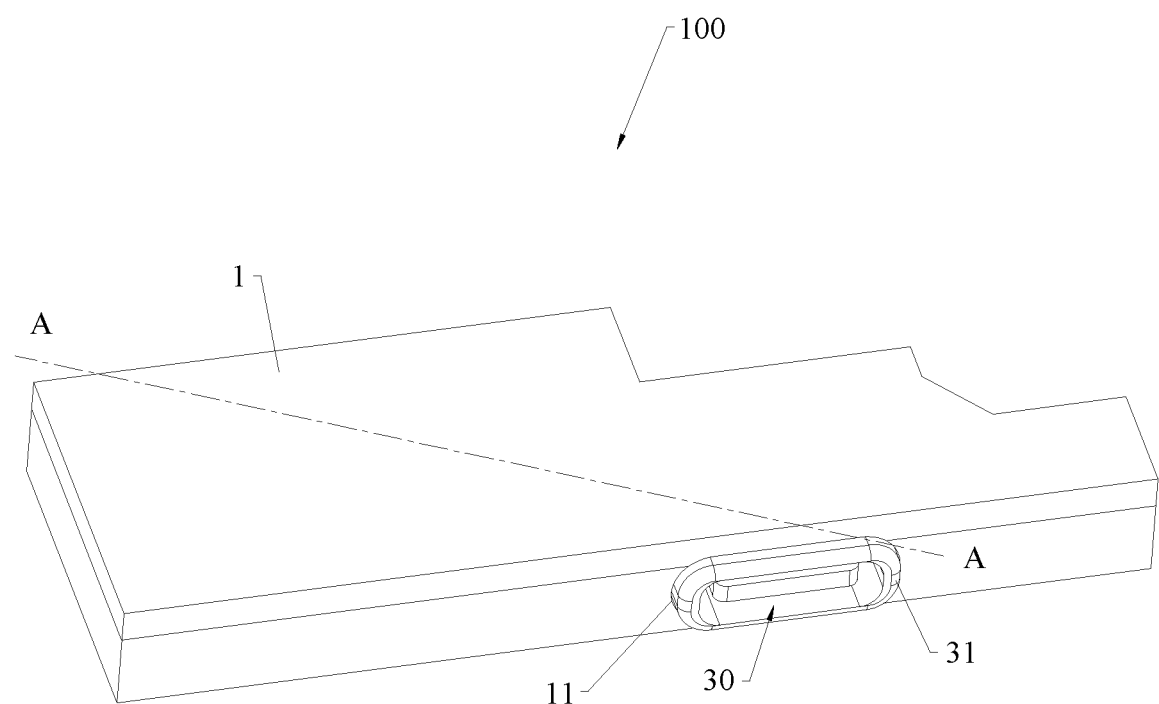
FIG. 2 is a schematic structural diagram of an audio component according to an embodiment of this application.

In one embodiment, referring to FIG. 1, FIG. 2, FIG. 4, and FIG. 6 together, one end of the shielding enclosure 31 sticks out the enclosure 1 from the connection hole 11, and an outer sidewall 311 of the shielding enclosure 31 cooperates with the hole wall 111 of the connection hole 11. In other words, one end of the shielding enclosure 31 is inserted into the connection hole 11, a part of one end of the shielding enclosure 31 is located in the outside of the enclosure 1, and the other end of the shielding enclosure 31 is accommodated in the receptacle 10. In this case, the hole wall 111 of the connection hole 11 limits the shielding enclosure 32. Because the part of the end of the shielding enclosure 31 is located in the outside of the enclosure 1, it is convenient for the external component to insert into the plug port 30, thereby improving experience of using the audio component 100 and the mobile terminal 200 by a user. In addition, as shown in FIG. 1 and FIG. 2, a part of the shielding enclosure 31 that sticks out the enclosure 1 can cooperate with an opening 301 on the housing 300 of the mobile terminal 200, so that the audio component 100 is fastened to the housing 300, and the plug port 30 can be connected to outside of the housing 300 by using the opening 301.

Figure 4:
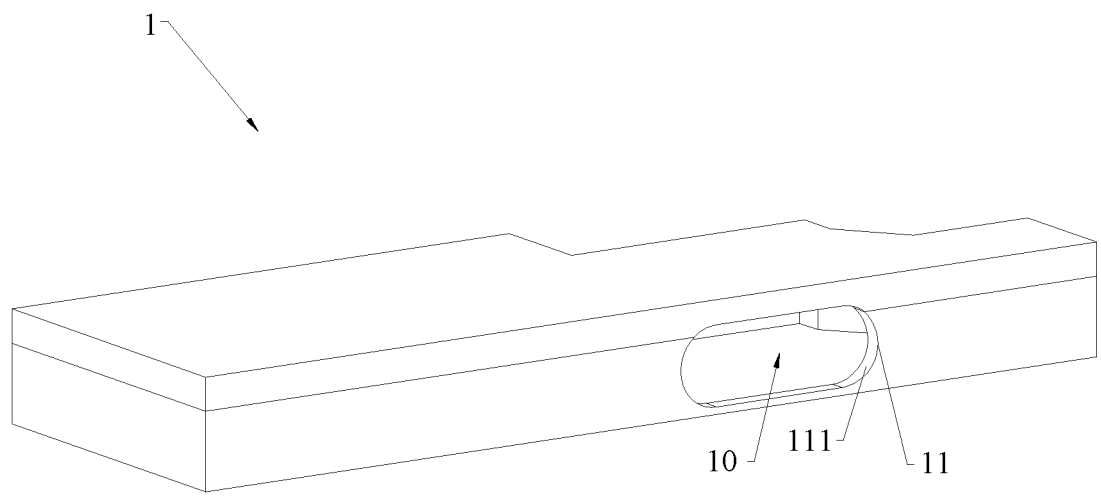
FIG. 4 is a schematic structural diagram of an enclosure of the audio component shown in FIG. 2.
Figure 7:
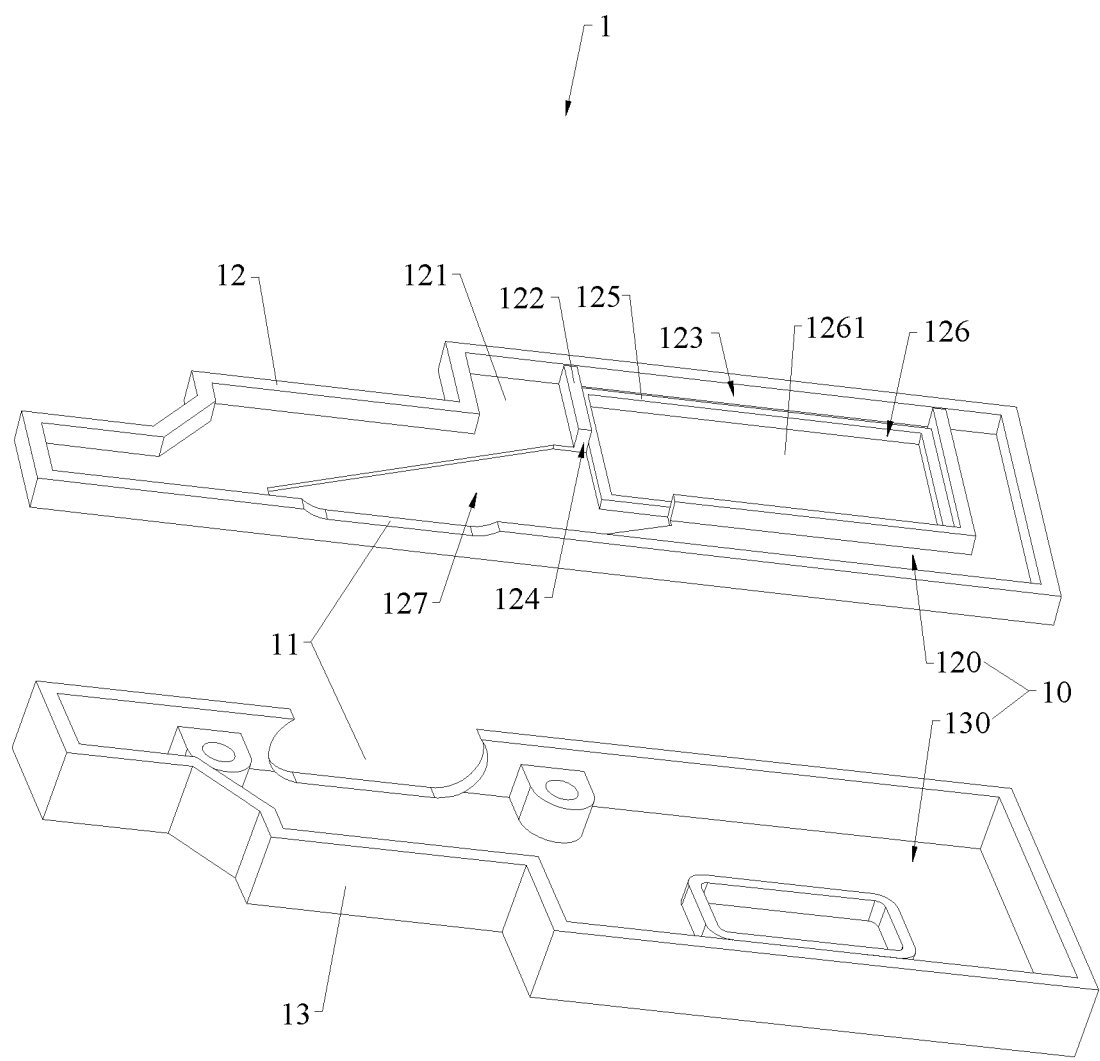
FIG. 7 is an exploded view of the enclosure shown in FIG. 4.

In one embodiment, referring to FIG. 3, FIG. 4, and FIG. 7 together, the enclosure 1 includes a first enclosure part 12 and a second enclosure part 13 that are combined together, and the receptacle 10 is formed between the first enclosure part 12 and the second enclosure part 13. A side of the first enclosure part 12 that faces the second enclosure part 13 is concave to form a first groove 120, and a side of the second enclosure part 13 that faces the first enclosure part 12 is concave to form a second groove 130. When the first enclosure part 12 and the second enclosure part 13 are combined together, the first groove 120 and the second groove 130 are combined to jointly form the receptacle 10.

The first enclosure part 12 and the second enclosure part 13 may be connected through bonding, screwing, buckling, or the like. A sealing element (not shown in the figure) is sandwiched between the first enclosure part 12 and the second enclosure part 13, and the sealing element is configured to seal the receptacle 10. The sealing element is in a ring shape, and a shape of the sealing element adapts to a shape of an end face on which the first enclosure part 12 is connected to the second enclosure part 13.

The enclosure 1 seals the speaker 2 in the receptacle 10, so that front and back cavities of the speaker 2 can be prevented from being short-circuited, to fully exert performance of the speaker 2, change a low frequency and a high frequency that are of a sound, and reproduce an authentic sound.

Both the first enclosure part 12 and the second enclosure part 13 use a plastic material, to reduce a weight of the audio component 100.

A part of the connection hole 11 is formed on the first enclosure part 12, and the other part is formed on the second enclosure part 13. The part that is of the connection hole 11 and that is formed on the first enclosure part 12 is smaller than the part that is of the connection hole 11 and that is formed on the second enclosure part 13, so that the shielding enclosure 31 can be directly positioned and fastened to the second enclosure part 13. In addition, this also helps implement fool proofing during assembly.

In one embodiment, referring to FIG. 3 and FIG. 5 together, an abutting protrusion 132 is disposed on an inner side surface 131 of the second enclosure part 13 that faces the receptacle 10. The speaker 2 is located between the first enclosure part 12 and the abutting protrusion 132, to form a first part 41 that is of the sound guide channel 4 and that is between the speaker 2 and the inner side surface 131 of the second enclosure part 13. Because the abutting protrusion 132 abuts against the speaker 2, space is formed between the speaker 2 and the inner side surface 131 of the second enclosure part 13, so that the first part 41 of the sound guide channel 4 can be constituted. A sound emitted by the speaker 2 enters the first part 41 of the sound guide channel 4.

A middle part of the abutting protrusion 132 is hollowed out. In this case, the abutting protrusion 132 is in an annular shape, to reduce a weight of the enclosure 1, thereby helping reduce weights of the audio component 100 and the mobile terminal 200.

In one embodiment, referring to FIG. 3, FIG. 5, and FIG. 7 together, a limiting protrusion 122 is disposed on an inner side surface 121 of the first enclosure part 12, placement space 123 is enclosed by the limiting protrusion 122, and an end of the speaker 2 away from the abutting protrusion 132 is located in the placement space 123. The limiting protrusion 122 can limit the speaker 2, so that the speaker 2 is fastened in the receptacle 10, thereby avoiding a risk of damage caused by shaking.

A support protrusion 125 is disposed in the placement space 123. The support protrusion 125 is fastened to the inner side surface 121 of the first enclosure part 12, and the support protrusion 125 protrudes in a direction of the receptacle 10. Vibration space 126 is enclosed by the support protrusion 125, and a diaphragm 21 of the speaker 2 exactly faces the vibration space 126. The vibration space 126 is used to implement a smoother vibration action of the diaphragm 21 and small resistance. In one embodiment, a bottom wall 1261 of the vibration space 126 is concave relative to the inner sidewall 121 of the first enclosure part 12, to increase a capacity of the vibration space 126. In one embodiment, the support protrusion 125 is connected to an inner wall of the limiting protrusion 122 that faces the placement space 123, to increase strength of the support protrusion 125 and the limiting protrusion 122.

Figure 8:
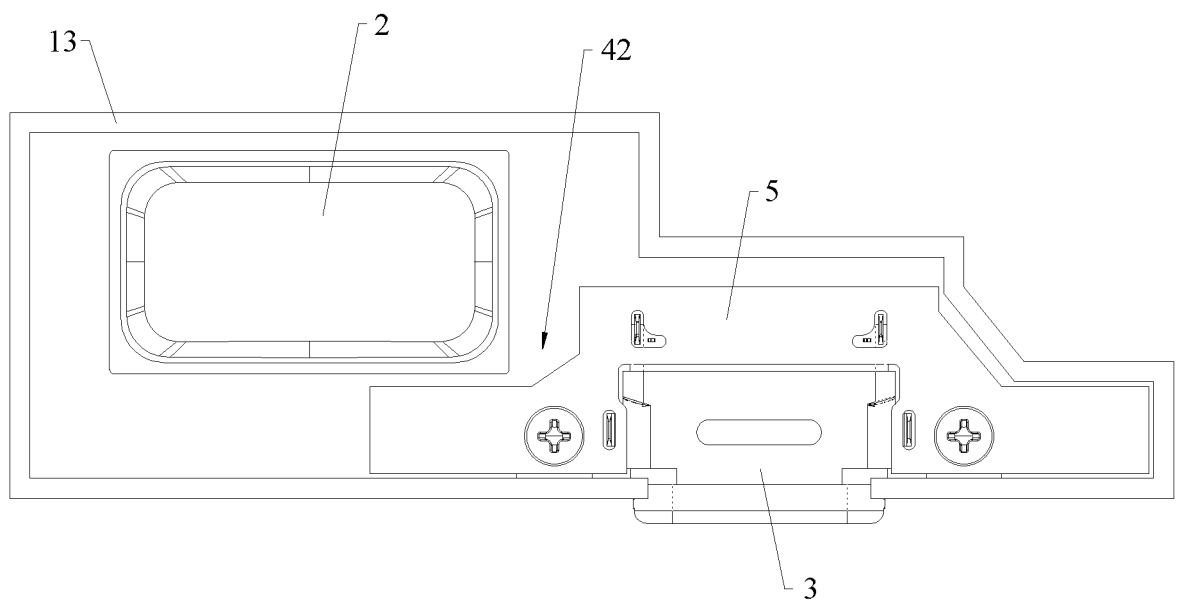
FIG. 8 is a schematic diagram of a partial structure of the audio component shown in FIG. 2.

In one embodiment, referring to FIG. 3, FIG. 5, and FIG. 8 together, the audio component 100 further includes a circuit board 5. The connector 3 is mounted on the circuit board 5. The circuit board 5 may be a main board of the mobile terminal 200. The connector 3 is electrically connected to a component of the mobile terminal 200 by using the circuit board 5. The circuit board 5 is accommodated in the receptacle 10 and is fastened to the second enclosure part 13. The circuit board 5 and the speaker 2 are alternately disposed, to form a second part 42 that is of the sound guide channel 4 and that is between the circuit board 5 and the speaker 2. The second part 42 of the sound guide channel 4 is connected to the first part 41 of the sound guide channel 4. The circuit board 5 and the speaker 2 are alternately disposed, so that assembly of the audio component 100 is also facilitated, to avoid damaging a component in an assembly process.

A plurality of connection posts 133 are convexly disposed on the inner side surface 131 of the second enclosure part 13. A plurality of connection holes 51 are disposed on the circuit board 5. The audio component 100 further includes a plurality of fasteners 6. The plurality of fasteners 6 pass through the plurality of connection holes 51 in a one-to-one correspondence and are fastened to the plurality of connection posts 133. At least two of the connection holes 51 are arranged on two opposite sides of the connector 3, to improve mounting stability of the connector 3. The fastener 6 may be a screw, a bolt, a rivet, or the like.

In one embodiment, referring to FIG. 5, the inner side surface 121 of the first enclosure part 12 and the circuit board 5 are alternately disposed, and the inner side surface 121 of the first enclosure part 12 and the connector 3 are alternately disposed, to form a third part 43 that is of the sound guide channel 4 and that is between the inner side surface 121 of the first enclosure part 12 and a side including the circuit board 5 and the connector 3. The third part 43 of the sound guide channel 4 is connected between the second part 43 of the sound guide channel 4 and the through hole 310. The sound emitted by the speaker 2 successively passes through the first part 41 of the sound guide channel 4, the second part 42 of the sound guide channel 4, the third part 43 of the sound guide channel 4, and the connection hole 310, and enters the plug port 30, to implement sound output.

In one embodiment, referring to FIG. 5 and FIG. 7 together, a concave guide trough 127 is disposed on the inner side surface 121 of the first enclosure part 12. The guide trough 127 is connected to the third part 43 of the sound guide channel 4. The guide trough 127 is disposed to reduce thickness of a part of an area of the first enclosure part 12, and increase a space capacity of the sound guide channel 4, so that propagation quality of the sound emitted by the speaker 2 is better.

In one embodiment, referring to FIG. 5 and FIG. 7 together, the guide trough 127 is connected between the second part 42 of the sound guide channel 4 and the through hole 310. An orthographic projection of a hole wall 3101 of the through hole 310 on the inner side surface 121 of the first enclosure part 12 falls into the guide trough 127. In other words, the guide trough 127 covers the through hole 310, so that the guide trough 127 can better guide the sound wave to the through hole 310 and the plug port 30.

As shown in FIG. 7, a notch 124 is disposed on one side of the limiting protrusion 122 that faces the second part 42 of the sound guide channel 4, and the notch 124 is configured to increase a space capacity of the sound guide channel 4, so that propagation quality of the sound emitted by the speaker 2 is better. The notch 124 connects the guide trough 127 and the third part 43 of the sound guide channel 4.

According to a second aspect, referring to FIG. 1 to FIG. 8 together, this application provides a mobile terminal 200, including a housing 300 and the foregoing audio component 100. The housing 300 includes an opening 301, and the opening 301 connects inside and outside that are of the housing 300. The audio component 100 is mounted in the inside of the housing 300, the connection hole 11 of the enclosure 1 exactly faces the opening 301, and the plug port 30 is connected to outside of the mobile terminal 200 by using the opening 301. The mobile terminal 200 in this embodiment of this application may be any device that has a communication function and a storage function, for example, an intelligent device that has a network function, such as a tablet computer, a mobile phone, an e-reader, a remote control, a personal computer (PC), a notebook computer, a vehicle-mounted device, a web television, or a wearable device.

In this embodiment, the connection hole 11 exactly faces the opening 301, and the plug port 30 is connected to the outside of the mobile terminal 200 by using the opening 301. Therefore, the mobile terminal 200 can implement a connection relationship between the connector 3 and the outside by using the opening 301, and can also implement sound output of the speaker 2 by using the opening 301. The connector 3 shares the opening 301 with the speaker 2, so that a quantity of holes that need to be disposed on the housing 300 is reduced, to reduce a risk that external vapor, dust, and the like enter inside of the mobile terminal 200, so that the mobile terminal 200 is not easily faulty or damaged. Therefore, the mobile terminal 200 has higher reliability and a relatively long service life. In addition, the opening 301 corresponding to the connection hole 11 is disposed on the housing 300 of the mobile terminal 200, so that a connection requirement of the connector 3 and a sound output requirement of the speaker 2 can be compatible. Therefore, an extra hole can be avoided in appearance of the housing 300, so that appearance of the mobile terminal 200 is simple. In addition, the holes on the housing 300 are reduced, so that processing and manufacturing costs of the housing 300 can be reduced, and a structural material (for example, a dust filter or a decoration part) in an existing speaker hole is omitted. Therefore, overall costs of the mobile terminal 200 are reduced.

A part of the shielding enclosure 31 is located in the opening 301, and a wall surface of the opening 301 cooperates with an outer sidewall 311 of the shielding enclosure 31, to limit the shielding enclosure 31, so that an external component is inserted into the plug port 30 of the shielding enclosure 31, thereby improving experience of using the mobile terminal 200 by a user.

Figure 9:
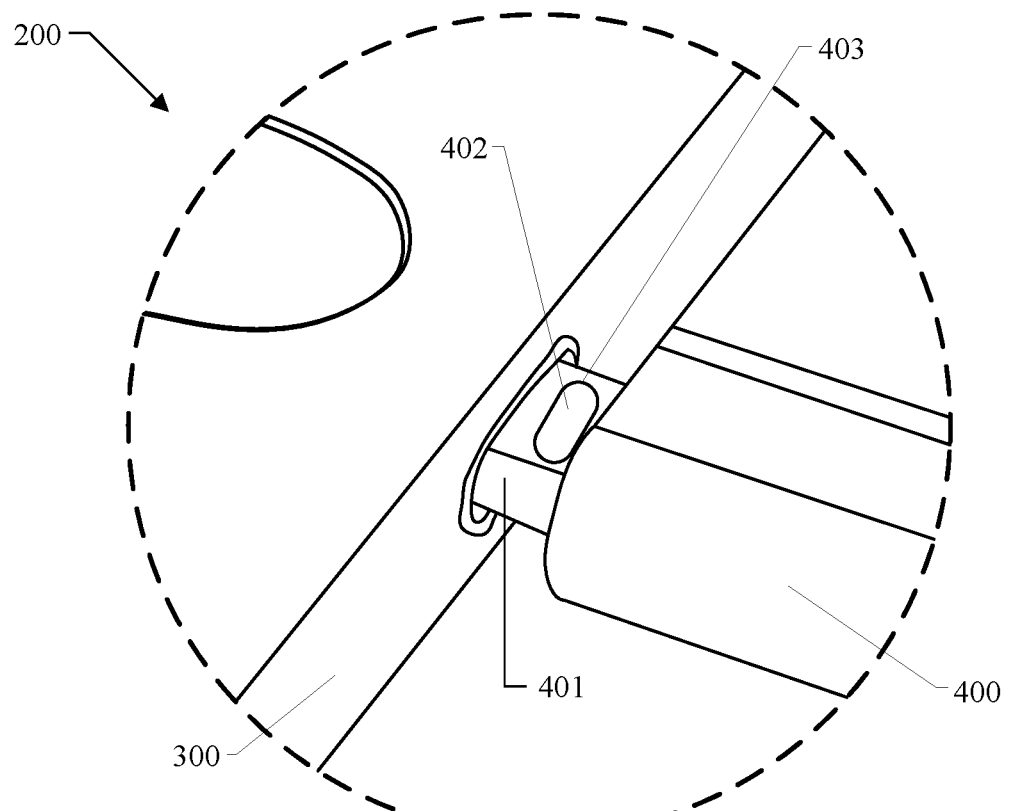
FIG. 9 is a schematic diagram of a partial structure of another embodiment of a mobile terminal according to an embodiment of this application.

In one embodiment, referring to FIG. 3, FIG. 5, and FIG. 9 together, the mobile terminal 200 further includes a plug component 400. The plug component 400 includes a shielding sleeve 401. A sound guide hole 403 is disposed on the shielding sleeve 401. When the plug component 400 is electrically connected to the connector 3, a part of the shielding sleeve 401 is inserted into the plug port 30, and the sound guide hole 403 is connected to the plug port 30 and at least a part of the sound guide hole 403 is located in the outside of the housing 300, to propagate, to the outside of the mobile terminal 200, a sound emitted by the speaker 2. The plug component 400 is detachably connected to the connector 3.

In this embodiment, the sound emitted by the speaker 2 successively passes through the sound guide channel 4, the connection hole 11, the plug port 30, and the sound guide hole 403, and then is propagated to the outside of the mobile terminal 200, to implement sound output. When the plug component 400 is plugged in the connector 3, the mobile terminal 200 can be charged or data transmission can be implemented. Therefore, when the plug component 400 is inserted into the plug port 30, functions such as charging and data transmission can be implemented for the mobile terminal 200, and sound output can also be implemented by using the sound guide hole 403.

It may be understood that the plug component 400 includes at least one component adapted to the connector 3. For example, the connector 3 is a female connector of a universal serial bus (USB) connector, and the plug component 400 includes a male connector of the universal serial bus connector 3. Certainly, in another embodiment, the connector 3 may alternatively be a male connector of a universal serial bus connector 3, and the plug component 400 includes a female connector of the universal serial bus connector. When the connector 3 is the universal serial bus connector 3, the plug port 30 is approximately in a shape of a runway-shaped long circular hole, so that the speaker 2 has a relatively large sound output area, thereby ensuring sound output quality. In another embodiment, the connector 3 may alternatively be another type of electrical connector. The plug component 400 may further include a connection cable, and the connection cable is connected to a connector (for example, a male connector) at one end of the plug component 400.

In one embodiment, as shown in FIG. 9, a plug interface 402 is formed on the shielding sleeve 401. The sound guide hole 403 penetrates one side of the shielding sleeve 401. The sound guide hole 403 is connected to the plug interface 402. When a part of the shielding sleeve 401 is inserted into the plug port 30, the plug interface 402 is connected to the plug port 30, and the sound guide hole 403 is located in the outside of the housing 300, to propagate, to the outside of the mobile terminal 200, the sound emitted by the speaker 2. In this embodiment, the sound emitted by the speaker 2 successively passes through the sound guide channel 4, the connection hole 11, the plug port 30, the plug interface 402, and the sound guide hole 403, and then is propagated to the outside of the mobile terminal 200, to implement sound output.

In one embodiment, when a part of the shielding sleeve 401 is inserted into the plug port 30, a part of the sound guide hole 403 is located in the inside of the housing 300 and connected to the plug port 30, the other part of the sound guide hole 403 is located in the outside of the housing 300, and the sound guide hole 403 directly guides a sound in the plug port 30 to the outside of the mobile terminal 200. The sound guide hole 403 may be a groove disposed on one side of the shielding sleeve 401, and the groove is a long strip shape.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio component, comprising an enclosure, a speaker, and a connector, wherein the enclosure comprises a receptacle and a connection hole connected to the receptacle, both the speaker and the connector are accommodated in the receptacle, a plug port of the connector is connected to outside of the enclosure by using the connection hole, a sound guide channel connected between the speaker and the plug port is formed in the receptacle, and the sound guide channel is configured to propagate, to the plug port, a sound emitted by the speaker,
wherein the connector comprises a shielding enclosure, the plug port is formed in the shielding enclosure, a through hole is disposed on the shielding enclosure, and the through hole is configured to connect the sound guide channel and the plug port.

2. The audio component according to claim 1, wherein one end of the shielding enclosure sticks out the enclosure from the connection hole, and an outer sidewall of the shielding enclosure cooperates with a hole wall of the connection hole.

3. The audio component according to claim 1, wherein the enclosure comprises a first enclosure part and a second enclosure part that are combined together, and the receptacle is formed between the first enclosure part and the second enclosure part; and
an abutting protrusion is disposed on an inner side surface of the second enclosure part that faces the receptacle, and the speaker is located between an inner side surface of the first enclosure part that faces the receptacle and the abutting protrusion, to form a first part that is of the sound guide channel and that is between the speaker and the inner side surface of the second enclosure part.

4. The audio component according to claim 3, wherein a limiting protrusion is disposed on the inner side surface of the first enclosure part, placement space is enclosed by the limiting protrusion, and an end of the speaker away from the abutting protrusion is located in the placement space.

5. The audio component according to claim 3, wherein the audio component further comprises a circuit board, the connector is mounted on the circuit board, the circuit board is accommodated in the receptacle and fastened to the second enclosure part, and the circuit board and the speaker are alternately disposed, to form a second part that is of the sound guide channel and that is between the circuit board and the speaker.

6. The audio component according to claim 5, wherein the inner side surface of the first enclosure part and the circuit board are alternately disposed, and the inner side surface of the first enclosure part and the connector are alternately disposed, to form a third part that is of the sound guide channel and that is between the inner side surface of the first enclosure part and a side comprising the circuit board and the connector.

7. The audio component according to claim 6, wherein a concave guide trough is disposed on the inner side surface of the first enclosure part, and the guide trough is connected to the third part of the sound guide channel.

8. The audio component according to claim 7, wherein the guide trough is connected between the second part of the sound guide channel and the through hole, and an orthographic projection of a hole wall of the through hole on the inner side surface of the first enclosure part falls into the guide trough.

9. The audio component according to claim 1, wherein the connector is a USB connector.

10. A mobile terminal, comprising a housing, a plug component, and an audio component, wherein the audio component comprises an enclosure, a speaker, and a connector, wherein the enclosure comprises a receptacle and a connection hole connected to the receptacle, both the speaker and the connector are accommodated in the receptacle, a plug port of the connector is connected to outside of the enclosure by using the connection hole, a sound guide channel connected between the speaker and the plug port is formed in the receptacle, and the sound guide channel is configured to propagate, to the plug port, a sound emitted by the speaker, wherein the housing comprises an opening, the opening is connected to inside and outside that are of the housing, the audio component is mounted in the inside of the housing, the connection hole of the enclosure exactly faces the opening, and the plug port is connected to outside of the mobile terminal by using the opening, wherein the plug component comprises a shielding sleeve, and a sound guide hole is disposed on the shielding sleeve; and when the plug component is electrically connected to the connector, a part of the shielding sleeve is inserted into the plug port, and the sound guide hole is connected to the plug port and at least a part of the sound guide hole is located in the outside of the housing, to propagate, to the outside of the mobile terminal, a sound emitted by the speaker.

11. The mobile terminal according to claim 10, wherein the connector comprises a shielding enclosure, the plug port is formed in the shielding enclosure, a through hole is disposed on the shielding enclosure, and the through hole is configured to connect the sound guide channel and the plug port.

12. The mobile terminal according to claim 11, wherein one end of the shielding enclosure sticks out the enclosure from the connection hole, and an outer sidewall of the shielding enclosure cooperates with a hole wall of the connection hole.

13. The mobile terminal according to claim 11, wherein the enclosure comprises a first enclosure part and a second enclosure part that are combined together, and the receptacle is formed between the first enclosure part and the second enclosure part; and an abutting protrusion is disposed on an inner side surface of the second enclosure part that faces the receptacle, and the speaker is located between an inner side surface of the first enclosure part that faces the receptacle and the abutting protrusion, to form a first part that is of the sound guide channel and that is between the speaker and the inner side surface of the second enclosure part.

14. The mobile terminal according to claim 13, wherein a limiting protrusion is disposed on the inner side surface of the first enclosure part, placement space is enclosed by the limiting protrusion, and an end of the speaker away from the abutting protrusion is located in the placement space.

15. The mobile terminal according to claim 13, wherein the audio component further comprises a circuit board, the connector is mounted on the circuit board, the circuit board is accommodated in the receptacle and fastened to the second enclosure part, and the circuit board and the speaker are alternately disposed, to form a second part that is of the sound guide channel and that is between the circuit board and the speaker.

16. The mobile terminal according to claim 15, wherein the inner side surface of the first enclosure part and the circuit board are alternately disposed, and the inner side surface of the first enclosure part and the connector are alternately disposed, to form a third part that is of the sound guide channel and that is between the inner side surface of the first enclosure part and a side comprising the circuit board and the connector.

17. The mobile terminal according to claim 16, wherein a concave guide trough is disposed on the inner side surface of the first enclosure part, and the guide trough is connected to the third part of the sound guide channel.

18. The mobile terminal according to claim 17, wherein the guide trough is connected between the second part of the sound guide channel and the through hole, and an orthographic projection of a hole wall of the through hole on the inner side surface of the first enclosure part falls into the guide trough.

19. The mobile terminal according to claim 10, wherein the connector is a USB connector.

* * * * *